Figure 1:
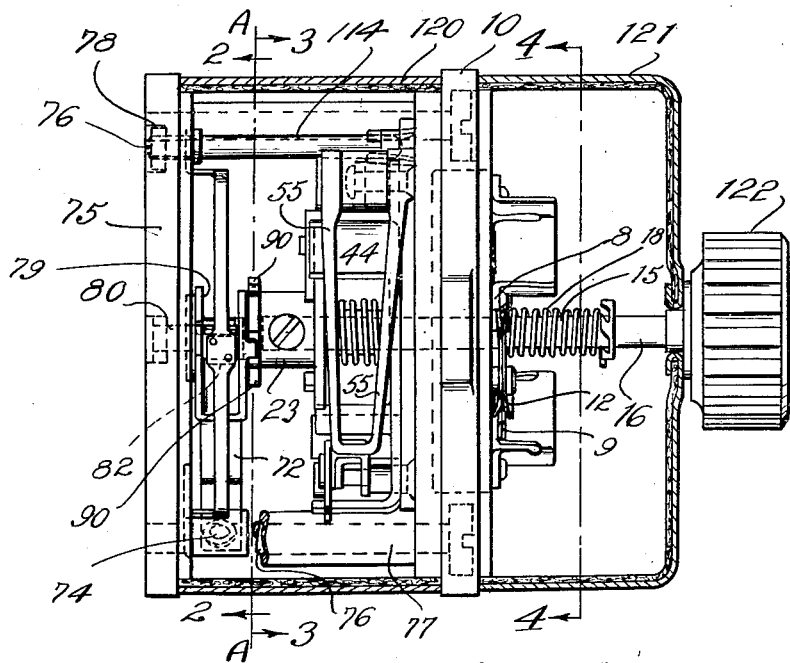

Dec. 15, 1925.

A. R. GOLDRICK 1,565,638

INDUCTION MOTOR STARTING AND OVERLOAD SWITCH

Filed July 14, 1923    3 Sheets-Sheet 1

INVENTOR
Albert R. Goldrick,
By Bates & Macklin
ATTYS.

Dec. 15, 1925. 1,565,638
A. R. GOLDRICK
INDUCTION MOTOR STARTING AND OVERLOAD SWITCH
Filed July 14, 1923  3 Sheets-Sheet 2

INVENTOR
Albert R. Goldrick
By Bates & Macklin,
ATTYS.

Dec. 15, 1925.
A. R. GOLDRICK
1,565,638
INDUCTION MOTOR STARTING AND OVERLOAD SWITCH
Filed July 14, 1923
3 Sheets-Sheet 3

INVENTOR
Albert R. Goldrick
BY Bates & Macklin
ATTYS.

Patented Dec. 15, 1925.

1,565,638

UNITED STATES PATENT OFFICE.

ALBERT R. GOLDRICK, OF CLEVELAND, OHIO, ASSIGNOR TO THE DOMESTIC ELECTRIC COMPANY, OF CLEVELAND, OHIO, A CORPORATION OF OHIO.

INDUCTION-MOTOR-STARTING AND OVERLOAD SWITCH.

Application filed July 14, 1923. Serial No. 651,595.

*To all whom it may concern:*

Be it known that I, ALBERT R. GOLDRICK, a citizen of the United States, residing at Cleveland, in the county of Cuyahoga and State of Ohio, have invented a certain new and useful Improvement in an Induction-Motor-Starting and Overload Switch, of which the following is a full, clear, and exact description, reference being had to the accompanying drawings.

This invention relates to circuit breakers and is particularly concerned with motor starting and overload switches. The general object of my invention is the provision of a plurality of switch mechanisms combined in an interdependent manner whereby a simple, effective means is provided which may be manually operated to close in proper order and time the usual two field circuits of a single phase induction motor.

Another object of my invention is the provision of a manually operated switch for use with small induction motors and which may have the combined characteristics of the usual quick make and brake snap or service switch, the emergency opening characteristics of an electro-responsive circuit breaker or overload switch, and the characteristics of a motor starting switch. To this end, a third switch mechanism is incorporated in the device in the nature of a thermo-responsive controller, which obviates the use of a so-called centrifugal switch such as is commonly provided in single phase motors to disconnect a shunt or starting winding of the motor from the service line after the motor has accelerated to a predetermined speed.

A further object of my invention is to provide an arrangement of three sets of switch elements, the sets cooperating in their functional characteristics whereby a service switch, an overload switch, and a starting switch may be combined in a compact manner. This I accomplish by coordinating these mechanisms whereby the overload switch may be automatically opened consequent to an overloading of the motor regardless of the open or closed condition of the other two switches, but the setting of all three mechanisms is effected by the action of a single manually operated member.

Other objects will be hereinafter disclosed in the following description referring to the accompanying drawings which disclose a preferred embodiment of my invention. The essential characteristics are summarized in the claims.

Figure 2:
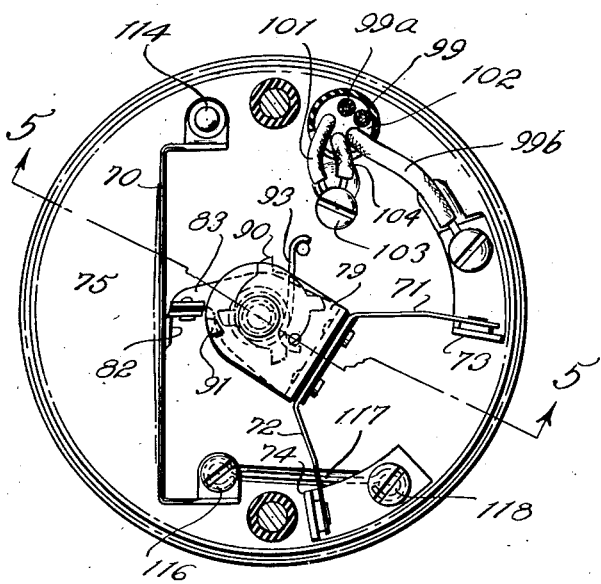
Figure 3:
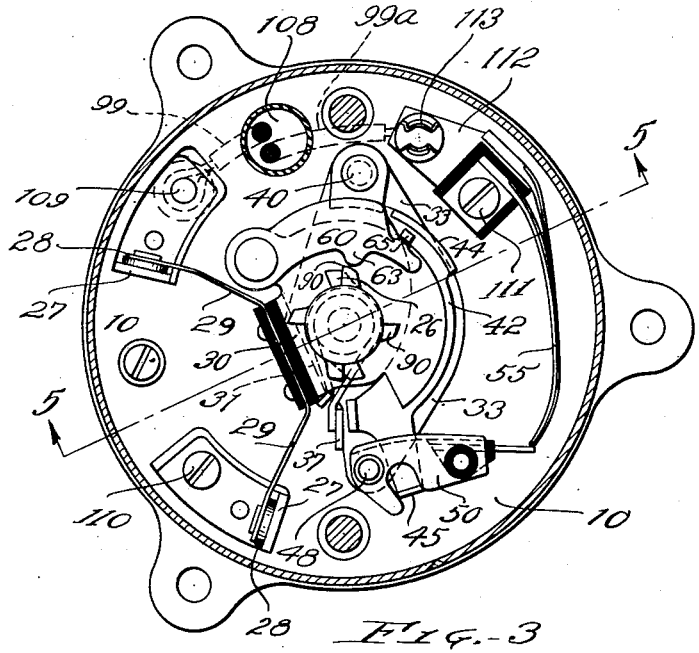
Figure 4:
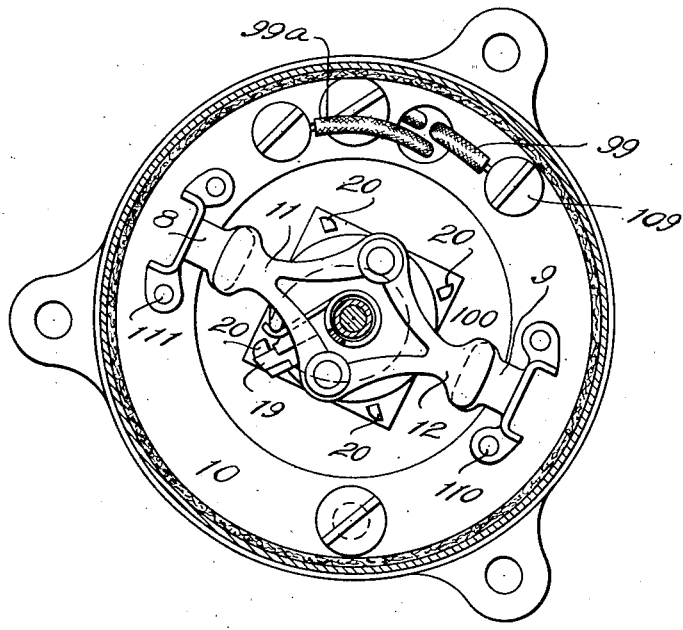
Figure 5:
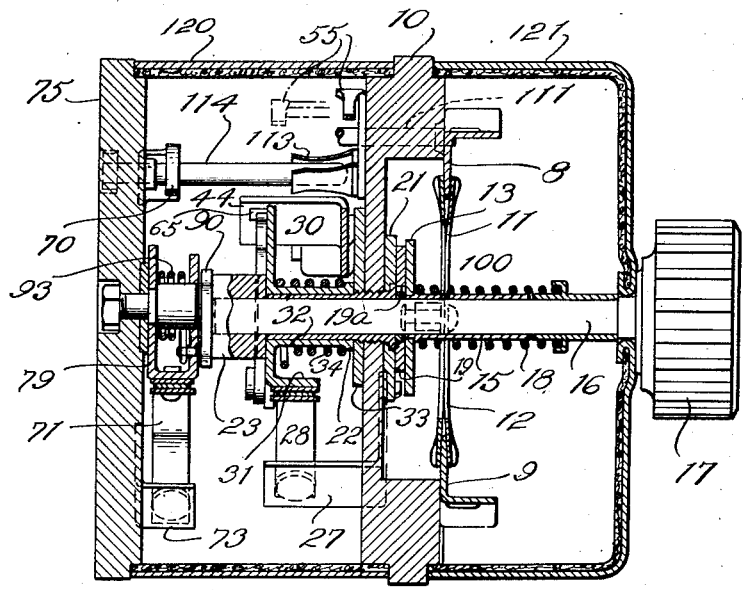
Figure 6:
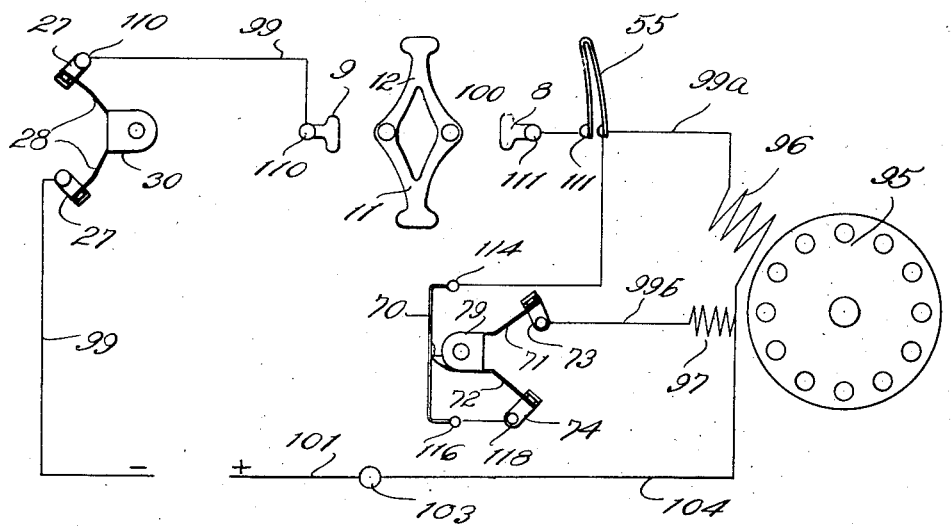

In the drawings, Fig. 1 is a side elevation of a combined manually operated snap switch and electro-responsive overload switch and an electro-responsive starting circuit switch mounted upon a common base and arranged to be closed by a single manually operated member, the housing or cover of the respective mechanisms being shown in cross section; Fig. 2 is a transverse cross-sectional view taken substantially along the line A—A and looking in the direction indicated by the arrows 2—2; Fig. 3 is a similar cross-sectional view taken along the line A—A but looking in the direction of the arrows 3—3; Fig. 4 is a transverse section taken substantially along the line 4—4 of Fig. 1 and showing a front elevation of the snap switch construction; Fig. 5 is a central section taken through the respective switch mechanisms substantially along the line 5—5 of Fig. 3; Fig. 6 is a diagrammatic representation of the contact members of the various switches and showing the preferred electrical association thereof.

The mechanism comprising the electro-responsive overload switch as well as the mechanism comprising the snap switch, as embodied in my present construction (see Figs. 3 and 4 respectively) is substantially the same in construction and operation as the snap switch and the overload switch construction disclosed in the Cook patent application, Serial No. 588,755, filed September 18, 1922.

In the present application, these two sets of mechanisms respectively comprise an electro-responsive circuit breaker for protecting the motor windings when the motor is overloaded and a manually operated snap switch which when being closed may effect the closing of the circuit breaker. As shown in Figs. 1 and 5, the snap switch and the overload switch are mounted upon a common base member 10 formed of any suitable insulating material such as bakelite. The snap switch mechanism is mounted upon the outer side of the base member 10, and comprises radial contact plates 11 and 12, which, upon each half turn of a manually operated member or shaft 16 engage stationary contact members 8 and 9 respectively, the latter members being rigidly mounted upon the base member 10. The contact plates 11 and 12 are mounted upon a sleeve 15 which is carried by the shaft 16, the latter being rotatable independently on the sleeve, but torsionally connected thereto by a spring 18. The shaft 16 carries a knob 17 upon the outer end thereof which, when turned, tensions the spring 18 which thereupon reacts upon the sleeve 15, and effects a rotation of the contact arms 11 and 12. Mounted upon the shaft 16 and rigid with the contact arms 11 and 12 is a disk member 13 which comprises a slide for carrying a latch dog 19. An eccentric 19ᵃ is rigid with the shaft and serves to withdraw the dog 19 out of engagement with lugs 20, rigidly mounted on the base 10, and which determine a quarter rotation of the contact arms 11 and 12 when moved by the spring 18.

A plate member 21, upon which the lugs 20, may be formed, comprises, with a threaded sleeve member 22 extending through the base member 10, a suitable bearing upon the base member for the shaft 16. The latter member extends through the base and beyond an extension of the sleeve 22 to provide support for and engagement with a cam member 23. The cam member is rigidly mounted upon the shaft member 16 and is the actuating or closing means for the overload switch (see Fig. 3) and the starting circuit switch, (see Fig. 2).

The overload switch may comprise stationary contacts 27, and contact members 28 mounted on flat spring arms 29, which are insulated from and carried by a rotary member 30. The member 30 is provided with an integral sleeve 32 rotatably mounted on the inward extension of the sleeve member 22 and is urged by a spring 34, mounted on the sleeve 32, in a clockwise direction. The spring 34 may thus engage a projection 31 on the carrier 30 and upon which the spring arms 29 are mounted, while the other end thereof engages a stop 37 in the nature of an upwardly extending lug formed in a plate member 33 rigidly mounted on the base, and in threaded engagement with the sleeve member 22. The plate member 33 is provided with an upward extension to support a pin 40, upon which a latching actuating arm 42 may swing. The latch actuating arm has a shoulder 44 which is engaged by a locking member 60 pivotally mounted on the swingable carrier 30. A projection or extension 45 formed on the latch actuating arm resets a latch 50 in a manner which will be presently described.

Mounted on the rigid plate 33 is a pin 48 which comprises a support for the latch 50, the latter having a projection 51 which is engaged by the lug 45 on the latch actuating member. A companion projection 32 engages the opposite side of the lug when the shaft 16 is rotated. Oppositely disposed lug members 26, formed on the collar member 23, engage an inward extension on the carrier locking member 60 and cause a shoulder 63 on this member to engage the projection 44 on the latch actuating arm 42.

When the shaft 16 is rotated, the carrier 30, and the contact arms mounted thereon, are rotated to bring the contacts to a seating position, thus closing the circuit. The locking member 60 on the carrier is acted upon by the lug 26 during the latter part of this movement and the locking member thus engages the shoulder 44 of the latch actuating member 42. A further turning movement of the shaft 16 causes the contact arms 11 and 12 to engage the rigid contacts 8 and 9, and the lugs or projections 26 on collar member 23 are carried out of engagement with the shoulder 63 on the member 60. The outward movement of the lock member causes it to engage a lug 65 on the carrier. Thus, the carrier is rotated by reason of the lug 26 engaging the shoulder 63 on the member 60 before the shoulder thereof is brought into engagement with the lug 44. When the lock member is engaged with the lug 44, the latch actuating member 42 is being urged in a clockwise direction and the finger 45 on that member thus reacts on the latch 50 causing the insulated end 53 thereof to be swung outwardly whereby the end of a U-shaped thermal couple member 55 will engage the insulated member 53 on the latch 50 immediately upon the lug member 26 being swung or turned free of the lock member 60. Hence, as the spring member 34 reacts on the member 42 to swing it outwardly, the movement of the finger 45 thereof is intercepted by the latch 50 and the contacts 28 are thereby maintained in seated relation with the stationary contacts 27.

The coordination of the operation of this mechanism with the starting circuit breaker will now be set forth. The starting circuit breaker may comprise a thermo-couple 70 adaptable to be connected in series in the starting circuit, and a latch for retaining yieldable contact fingers 71 and 72 in closed relation with stationary contact fingers 73 and 74 respectively. The thermo-couple 70 and the stationary contact members may be mounted upon a supporting disc 75 formed of a suitable insulating material such as fibre or bakelite. The supporting member 75 may be mounted in spaced relation to the base member 10 upon bolt members 76, carrying spacing sleeves 77 which may abut the members 10 and 75 while nut members 78 serve to removably secure the base member 75 upon the bolt members 76.

The yieldable contact arms 71 and 72 are mounted upon and suitably insulated from a carrier member 79 which is swingably mounted upon a stud 80 rigidly secured to the base member 75. The stud 80 is positioned eccentrically relative to the switch shaft 16 for a purpose presently to be described. The locking of the carrier 79, with the contact arms 71 and 72 in circuit closing relation to the contacts 73 and 74, is accomplished by the engagement of a plate member 81 engaging a shoulder 82 formed on the inner side of the thermo-couple 70, the plate 81 being mounted upon an extension or arm 83 integral with the carrier 79; the carrier 79 being preferably U-shaped for this purpose and to afford a proper bearing on the stud 80. Rotating or swinging of the carrier 79 will thus cause the plate 81 to contact with the under side of the thermo-couple member 70 and cause it to be deflected outwardly until the plate is swung free of the portion which forms the shoulder 82. The reaction due to the deflecting of the yieldable members when contacting with their respective stationary contacts will thus cause the plate 81 to lock upon the shoulder 82 as well as the direct action of a spring member 93 as will be presently set forth.

The rotation of the carrier 79 by actuation of the shaft 16 is accomplished by the engagement of cam portions 90 preferably formed integrally with the sleeve 23 and comprising four in number equally spaced to correspond to the quarter movements of the shaft member 16. These cam portions 90 engage a lug 91 extending from a carrier member 79 and inasmuch as the carrier is eccentrically mounted relative to the shaft, the cam portion 90 becomes disengaged from the lug 91 at a point in the rotation of the carrier 79 which is after the plate 81 has been moved beyond the shoulder 82 in a clockwise direction, see Fig. 2.

The conductive capacity of the thermocouple member 70 is predetermined in accordance with the size of motor to which the switch mechanism is to be adapted, whereby the current traversing the thermocouple will cause a heating of that member, thus effecting an outward deflecting or buckling of the member and bringing about a disengagement of the shoulder 82 with the carrier plate 81. The spring member 93 previously referred to, may be concentrically mounted on the stud 80 and may have one end thereof secured to the stud or to the base member 75, while the other end reacts upon the carrier 79 to cause it to move in a counter-clockwise direction when the plate is disengaged, thus opening the starting coil current. It will be understood that by increasing or decreasing the cross section of the thermo-couple 70, the resistance thereof may be correspondingly increased or diminished, and the period in which the starting coil of the motor is energized may be thus determined.

The electrical connections between the snap switch, the overload switch and the starting switch may conform to the disclosure of Fig. 6 wherein 95 represents the rotor of a squirrel cage motor and 96 the single phase or main line field winding of the motor, 97 the shunt or starting winding. The snap switch indicated at 100, is interposed in one of the main line circuit wires 99, which line includes the stationary contacts 27 of the overload switch. The U-shaped thermo-responsive member 55 is connected in series and constitutes a part of the line 99. The thermo-couple member 70 is connected with one of the stationary contacts of the snap switch, and to one of the stationary contacts 73 of the starting switch. The other stationary contact 74 of the starting switch may be connected directly to the starting coil 97 of the motor through the circuit breaker arms 71 and 72. The line 101 completes the connection from the windings 96 and 97 to the source of current 98.

Tracing the embodiment of this diagram in the switch construction, we have, in Fig. 2, a two-strand wire carrying current from the source of supply and entering the switch at an opening 105 formed in the base member 75. One of the strands 101 extends to a contact or clamping screw 103 which connects the strand with the strand 104 of a three-strand wire passing out of the switch through the opening 105, to the motor. The second strand 99 of the first named wire, extends from the base member 75 forwardly and passes through an opening 108, (see Figs. 2 and 3,) formed in the base member 10 and is connected by a terminal screw 109 to the stationary contact 27. The current then traverses the yieldable contact arms 29 to the other stationary contact 27, thence to screw member 110, returning through the base member 10, and to the stationary contact member 9 of the snap switch. The current then traverses the snap switch arms 11 and 12 to the second stationary contact 8 of the snap switch and thence through screw member 111 to the opposite side of the base member 10. The screw member 111 comprises a connection between the stationary contact 8 and one end of the U-shaped thermo-couple 55. Hence the current traverses the thermo-couple thence through the plate 112 where it is divided, there being a lead wire 99" connected to the plate and comprising a second strand of the three-strand wire extending to the main field winding of the motor. The current also passes from the plate 112 through a permanently closed switch comprising contacts 113 and a pin member 114, the latter being carried by the base member 75 and is connected to one end of the thermo couple member 70. The current then passes through the thermo-couple member 70 whence it passes to a screw member 116 and therefrom, through a connection 117, to a terminal screw member 118 which connects the wire 117 with the stationary contact 74. The current may then pass through the yieldable contact members 72 and 71 to the contact 73, thence to the motor lead wire 99[b] comprising the third strand of the three strand cable extending to the motor, the latter strand being connected to the starting coil in the motor field.

From the foregoing description it will be understood that the use of my mechanism would readily obviate the necessity for a complicated mechanical mechanism in the form of a centrifugal switch for disconnecting the starting coils of the motor field after the motor has attained a predetermined speed when being operated under full load. One electrically responsive switch mechanism is directed only to closing the starting coil of the motor after which it opens the circuit consequent to the development of heat in a locking member which may take the form of a thermo-couple comprising a part of the starting circuit. The overload switch furnishes the other function of a centrifugal switch, namely the protection of the motor in case of an extreme overload in that the main circuit is opened and can not be maintained closed even though the snap switch is repeatedly operated. Furthermore, in the embodiment of my invention as disclosed in the drawings, the mechanisms may be mounted upon two spaced apart base members and may be arranged in a compact manner whereby the usual snap switch may be conveniently combined therewith and a single manually operated member may serve to control all three mechanisms when it is desired to close the motor circuits.

The device may be housed by a cylindrical cover 120 resting on shoulders formed on the respective base members and a cap 121 which may be maintained in place to house the snap switch by a manually operated knob 122 in a manner well known in the art.

I claim:—

1. In combination, a motor having a field winding including a starting coil, a switch mechanism controlling the field and comprising contacts tending to open, a second switch mechanism having a similar group of contacts, carrier members supporting the contacts, a latch mechanism for engaging each carrier member, a manually operated mechanism for closing the contacts and for setting the latches, electro-responsive means associated with each switch mechanism for releasing the latches to allow the contacts to open upon an overload current traversing the field winding and a third switch mechanism operated only when said manually operable mechanism is actuated, for completing the starting coil circuit.

2. In combination a motor having a field winding including a starting coil, an electrical switch comprising separable contacts controlling the field, means for closing the contacts, a latching mechanism for holding the contacts closed, electro-responsive means in the field circuit for releasing said latching mechanism, a manually operated member for actuating the closing means, a second set of separable contacts, means for closing these contacts, an electro-responsive means in the starting coil circuit for releasing the contacts, said manually operated member serving to close the last named contacts and a snap switch actuated by said manually operable member.

3. In combination, a motor having a field winding including a starting coil, a switch mechanism comprising contacts tending to open, a second switch mechanism having a similar group of contacts, a plurality of latching means for maintaining both groups of contacts closed, a manually operated mechanism for moving the contacts to latched positions, electro-responsive means in the field circuit and associated with each switch mechanism for releasing the latches and a third switch mechanism, and a manually operable mechanism cooperating with the three switch mechanisms to close the contacts thereof.

4. In combination, a motor having a field winding including a starting coil, a switch mechanism comprising contacts, means tending to close the contacts, a latching mechanism for holding the contacts closed, electro-responsive means in the main field circuit for releasing said latching mechanism, a mechanism for actuating the closing means a second group of separable contacts, means for closing these contacts, a second electro-responsive means in the starting coil circuit for maintaining the contacts closed during a predetermined period, said last named contacts being brought to a closing relation by the mechanism actuating the closing means and a snap switch controlling the circuit of said first two named switch mechanisms.

5. In combination, a motor having a field winding including a starting coil, a switch mechanism comprising contacts controlling the field and tending to open, a second switch mechanism having a similar group of contacts, a pair of independently movable contact carriers, a latch mechanism for separately engaging each carrier member, a manually operated mechanism acting on both carriers to close the contacts, means tending to open each set of contacts independently, electro-resposive means in the main field and starting coil currents respectively and associated with each switch mechanism for releasing the latches and allowing the contacts to open, a third switch mechanism, means tending to open the same and a common means reacting on the contact opening means of each switch mechanism whereby said common means may be effective in closing all of the contacts, to start the motor.

6. In combination, a motor having a field winding including a starting coil, a circuit breaker tending to open, a latch for holding it closed, an electro-responsive means restraining the latch and connected in the main field circuit, a manually operated mechanism adapted to be temporarily connected with the circuit breaker to close the same when open, the field being thus governed by the circuit breaker, a second circuit breaker mechanism connected in the starting coil circuit, thermo-responsive means in said last named circuit for maintaining said second circuit breaker closed during a predetermined period, a manually operated switch and means including said manually operated member for closing said two circuit breakers and said switch, to start the motor.

7. In combination, a motor having a field winding including a starting coil, a switch for electric current comprising two pairs of separable contacts controlling the main and starting coils, a closing mechanism for each set of contacts, including a manually operable member common to both, means for causing the latter to be released from the contacts after they are fully closed, a snap switch operated by said manually operated member, thermo-responsive means for maintaining each one of the circuit breakers closed, one of said means being connected in the starting coil circuit and arranged to release one of the circuit breakers after a predetermined motor starting period.

8. In combination, a motor having a field winding including a starting coil, a multiple switch controlling the respective field circuits comprising a plurality of separable contacts independently operable in pairs, a closing mechanism for the contacts, means for causing the latter to be released from the contacts after they are fully closed, a switch operated by said closing mechanism and thermo-responsive means connected in the respective field circuits for maintaining each one of the circuit breakers closed.

9. In combination, a motor having a field winding including a starting coil, a circuit breaker controlling the field circuits and tending to open and having a latch holding it closed, an electro-responsive means in the field circuit for releasing the latch, a manually operated switch, a connecting means between the circuit breaker mechanism and the manually operated switch whereby movement of the latter may close the circuit breaker and thereafter be independent of the circuit breaker while the circuit breaker remains closed, a second circuit breaker mechanism comprising a pair of contacts tending to open, a latch mechanism for maintaining said contacts closed, and an electro-responsive mechanism connected in the starting coil circuit and acting to retain the latch during a predetermined motor starting period.

10. In combination, an electric motor of the squirrel cage type, a manually operated switch for controlling the field circuit of the motor, a second switch controlling said circuit and connected in series with the first switch, an electro-responsive means for causing said second switch to open when the electrical load on the field of the motor exceeds a predetermined amperage, a third switch mechanism for controlling the starting coil circuit of the motor, and electro-responsive means in said circuit for maintaining said last named switch closed during a predetermined period in which the motor may attain a full load speed.

11. In combination an electric motor of the squirrel cage type, a manually operated switch controlling the field circuit of the motor, a second switch controlling said circuit and connected in series with the first switch, an electro-responsive means for causing said second switch to open when the electrical load on the field of the motor exceeds a predetermined amperage, a third switch mechanism controlling the starting coil circuit of the motor, electro-responsive means in said circuit for maintaining said last named switch closed during a predetermined period in which the motor may attain a full load speed and a manually operated means for simultaneously closing all of the switch mechanisms.

12. The combination with a motor of the squirrel cage type of an electro-responsive circuit breaker, yielding means tending to open the breaker, a latching means for holding the breaker closed, a snap switch governing the current through the electro-responsive means and to the main field of the motor, a second circuit breaker, yielding means for maintaining said second circuit breaker closed, a second electro-responsive means electrically connected to said first named electro-responsive means and to the starting coil circuit of the motor and tending to release said second circuit breaker, and a releasable connecting means between the snap switch and the two circuit breakers whereby the circuits may be closed and the circuit breakers thereafter be free to act independently of said releasable connecting means, whereby the starting circuit may be opened within a predetermined period and the main field circuit opened upon the occurrence of an electrical overload in the main field.

13. A manually operated snap switch, an overload switch, electro-responsive means for releasing the overload switch, a time element switch, electro-responsive means for maintaining the switch in a closed condition during such time element, and a common, manually operated means for closing all three switches.

14. In a circuit controller of the character described, the combination of a manually operated snap switch, a circuit breaker including locking means tending to maintain the circuit breaker closed and an electro-responsive means for releasing the locking means, a second circuit breaker including a similar locking means and electro-responsive means, the first named electro-responsive means being adaptable to open a circuit consequent to an overloading thereof, the second named electro-responsive means being adapted to open an auxiliary circuit branching from the circuit of the electro-responsive means and functioning independently of the latter and a rotatable manually operated member for closing the snap switch and for setting both electro-responsive means to locking position.

In testimony whereof, I hereunto affix my signature.

ALBERT R. GOLDRICK.